United States Patent
Zenner et al.

(10) Patent No.: US 12,497,547 B2
(45) Date of Patent: Dec. 16, 2025

(54) WATER-BASED FIRE RETARDANT THIN FILM ADHESIVE

(71) Applicant: 3M INNOVATIVE PROPERTIES COMPANY, St. Paul, MN (US)

(72) Inventors: Michael D. Zenner, Hudson, WI (US); Ryan K. McKenney, Roseville, MN (US); Dillon S. Gentekos, St. Paul, MN (US); Eumi Pyun, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 412 days.

(21) Appl. No.: 17/916,172

(22) PCT Filed: Mar. 31, 2021

(86) PCT No.: PCT/IB2021/052692
§ 371 (c)(1),
(2) Date: Sep. 30, 2022

(87) PCT Pub. No.: WO2021/198948
PCT Pub. Date: Oct. 7, 2021

(65) Prior Publication Data
US 2023/0174831 A1 Jun. 8, 2023

Related U.S. Application Data

(60) Provisional application No. 63/003,482, filed on Apr. 1, 2020.

(51) Int. Cl.
| | | |
|---|---|---|
| C09J 11/06 | (2006.01) | |
| C09J 7/28 | (2018.01) | |
| C09J 7/38 | (2018.01) | |
| C09J 121/00 | (2006.01) | |
| C09J 133/08 | (2006.01) | |

(52) U.S. Cl.
CPC .............. C09J 11/06 (2013.01); C09J 7/28 (2018.01); C09J 7/385 (2018.01); C09J 121/00 (2013.01); C09J 133/08 (2013.01); *C09J 2301/122* (2020.08); *C09J 2301/302* (2020.08); *C09J 2301/312* (2020.08); *C09J 2301/408* (2020.08)

(58) Field of Classification Search
CPC ..... C09J 11/06; C09J 7/28; C09J 7/385; C09J 121/00; C09J 133/08; C09J 2301/122; C09J 2301/302; C09J 2301/312; C09J 2301/408; C09J 2400/163; C09J 2421/00; C09J 2433/00; C09J 7/10; C09J 7/381; C09J 133/04; C08K 5/5313; C08K 2201/005; C08K 5/5397; C08K 5/0066; C08K 5/53

See application file for complete search history.

(56) References Cited

U.S. PATENT DOCUMENTS

| | | | | |
|---|---|---|---|---|
| 2001/0049025 A1* | 12/2001 | Kollaja | ..................... | B32B 7/12 428/521 |
| 2008/0241529 A1* | 10/2008 | Bauer | ..................... | C09J 11/06 106/217.7 |

FOREIGN PATENT DOCUMENTS

| | | |
|---|---|---|
| EP | 0775736 A2 | 5/1997 |
| WO | 2009052335 A1 | 4/2009 |
| WO | 2014093375 A1 | 6/2014 |
| WO | 2015148314 A1 | 10/2015 |
| WO | 2020155139 A1 | 8/2020 |

OTHER PUBLICATIONS

Horold, "Phosphinates, the Flame Retardants for Polymers in Electronics," Clariant publication dated Nov. 24, 2006. (Year: 2006).*
International Search Report for PCT International Application No. PCT/IB2021/052692, mailed on Jun. 4, 2021, 5 pages.

* cited by examiner

*Primary Examiner* — Cynthia L Schaller
(74) *Attorney, Agent, or Firm* — Kathleen B. Gross

(57) ABSTRACT

Adhesives comprising: a) 35-85 weight percent of a pressure sensitive adhesive comprising: i) a polymer selected from rubbers and polyacrylate polymers and ii) optionally one or more tackifiers; and dispersed therein b) 15-50 weight percent fire retardant (FR) particles comprising one or more phosphorus-containing compounds selected from organophosphine oxides and organophosphinates. In some embodiments, the phosphorus-containing compounds comprise 35-65 weight percent of an organophosphine oxide and 65-35 weight percent of an organophosphinate. The FR particles may have a D50 particle size of 1-120 micrometers, 40-120 micrometers, or 70-120 micrometers. Adhesive films comprising the adhesives described herein may be free-standing adhesive films or adhesive layers comprised in tapes.

20 Claims, No Drawings

WATER-BASED FIRE RETARDANT THIN FILM ADHESIVE

CROSS REFERENCE TO RELATED APPLICATIONS

This application is a national stage filing under 35 U.S.C. 371 of PCT/IB2021/052692, filed Mar. 31, 2021, which claims the benefit of U.S. Provisional Application No. 63/003,482, filed Apr. 1, 2020, the disclosure of which is incorporated by reference in its entirety herein.

FIELD OF THE DISCLOSURE

This disclosure relates to water-based, non-halogen, non-heavy metal, fire retardant adhesives for use in thin film applications which comprise fire retardant particles comprising organophosphine oxides or organophosphinates.

BACKGROUND OF THE DISCLOSURE

Flexible ductwork is used in HVAC constructions all over the world. This ductwork must meet many building specifications, such as R-value, flammability ratings and vapor permeability. Generally, the ductwork construction is comprised of an inner core containing a metal coil laminated between layers of clear PET. The inner core is then wrapped with fiberglass insulation which is finally wrapped with an outer layer. This final wrapping constitutes scrim, laminated between a layer of clear PET and metalized PET with thin adhesive layers.

Many traditional fire retardants work poorly with thin adhesive layers. Historically, fire retardants that include heavy metals and/or halogenated chemicals have been added. However, these chemicals raise toxicity concerns while burning.

SUMMARY OF THE DISCLOSURE

Briefly, the present disclosure provides adhesives comprising: a) 35-85 weight percent of a pressure sensitive adhesive comprising: i) a polymer selected from rubbers and polyacrylate polymers and ii) optionally one or more tackifiers; and dispersed therein b) 15-50 weight percent fire retardant (FR) particles comprising one or more phosphorus-containing compounds selected from organophosphine oxides and organophosphinates. In some embodiments, the fire retardant (FR) particles comprise both an organophosphine oxide and an organophosphinate. In some embodiments, the phosphorus-containing compounds comprise 35-65 weight percent of an organophosphine oxide and 65-35 weight percent of an organophosphinate. The FR particles may have an average particle size of 1-120 micrometers, 40-120 micrometers, 70-120 micrometers, or other limitations discloses herein. The adhesive may be water-based and may achieve good adhesion and fire retardancy while comprising essentially no heavy metals, essentially no halogen-containing compounds, and essentially no common solvents. Additional embodiments of the adhesives of the present disclosure are described below.

In another aspect, the present disclosure provides adhesive films comprising the adhesives described herein, which may be free-standing adhesive films or adhesive layers comprised in tapes. The adhesive films or layers may have a thickness of between 5-1000 micrometers. Additional embodiments of the adhesive films and tapes of the present disclosure are described below.

The preceding summary of the present disclosure is not intended to describe each embodiment of the present invention. The details of one or more embodiments of the invention are also set forth in the description below. Other features, objects, and advantages of the invention will be apparent from the description and from the claims.

In this Application:

"common solvents" refers to low molecular weight organic liquids commonly used as solvents by practitioners in the art, which may include aliphatic and alicyclic hydrocarbons (e.g., hexane, heptane, and cyclohexane), aromatic solvents (e.g., benzene, toluene, and xylene), ethers (e.g., diethyl ether, glyme, diglyme, diisopropyl ether, and tetrahydrofuran), esters (e.g., ethyl acetate and butyl acetate), alcohols (e.g., ethanol and isopropyl alcohol), ketones (e.g., acetone, methyl ethyl ketone, and methyl isobutyl ketone), sulfoxides (e.g., dimethyl sulfoxide), amides (e.g., N,N-dimethylformamide, N,N-dimethylacetamide, and N-methyl-2-pyrrolidone), halogenated solvents (e.g., methylchloroform, 1,1,2-trichloro-1,2,2-trifluoroethane, trichloroethylene, and trifluorotoluene), and mixtures thereof; providing that "common solvents" excludes species that act as monomers or otherwise as reactants in a given composition;

"directly bound" refers to two materials that are in direct contact with each other and bound together;

"essentially no" amount of a material in a composition may be substituted with "less than 5 weight percent", "less than 4 weight percent", "less than 3 weight percent", "less than 2 weight percent", "less than 1 weight percent", "less than 0.5 weight percent", "less than 0.1 weight percent", or "none";

"film-forming" means capable of forming a continuous and coherent film, which in some embodiments may result from one or more of solidification, curing, drying, or solvent removal of a melt, solution, suspension, or the like;

"free-standing film" means a film that is solid at normal temperature and pressure (NTP) and has mechanical integrity independent of contact with any supporting material (which excludes, inter alia, liquids, surface coatings dried or cured in situ such as paints or primers, and films without independent mechanical integrity);

"integral" or "integral construction" refer to a construction that is a single piece, though it may comprise elements that can be separately named, that may be a unitary article, or that may be formed from multiple pieces where multiple pieces are permanently joined (such as by welding, permanent adhesive, permanent fasteners, or methods that cannot be reversed non-destructively) to form a single piece construction;

"intrinsically crosslinked", with regard to a polymer or oligomer, means crosslinked by incorporation of polyfunctional monomers comprising multiple polymerizable functional groups of a type that copolymerizes with other monomers comprising the polymer, or polyfunctional monomers comprising multiple polymerizable functional groups of the same type as other monomers comprising the polymer, such that polyfunctional monomer units are incorporated into the backbone of multiple polymer strands to form crosslinks between those strands;

"(meth)acrylate" includes, separately and collectively, methacrylate and acrylate;

"monomer unit" of a polymer or oligomer is a segment of a polymer or oligomer derived from a single monomer;

"normal temperature and pressure" or "NTP" means a temperature of 20° C. (293.15 K, 68° F.) and an absolute pressure of 1 atm (14.696 psi, 101.325 kPa);

"organophosphate" means a chemical species according to the general formula $P(O)(OR)_3$, where each R group is selected independently from organic groups;

"organophosphonate" means a chemical species according to the general formula $RP(O)(OR)_2$, where each R group is selected independently from organic groups;

"organophosphinate" means a chemical species according to the general formula $R_2P(O)(OR)$, where each R group is selected independently from organic groups;

"organophosphine oxide" means a chemical species according to the general formula $R_3P(O)$, where each R group is selected independently from organic groups;

"pressure sensitive adhesive" or "PSA" means materials having the following properties: a) tacky surface, b) the ability to adhere with no more than finger pressure, c) the ability to adhere without activation by any energy source, d) sufficient ability to hold onto the intended adherend, and preferably e) sufficient cohesive strength to be removed cleanly from the adherend; which materials typically meet the Dahlquist criterion of having a storage modulus at 1 Hz and room temperature of less than 0.3 MPa;

"rubber" means elastomeric natural or synthetic polymers or copolymers of substituted or unsubstituted isoprene or butadiene, elastomeric silicones, or combinations of any of the preceding;

"structural adhesive" means an adhesive that binds by irreversible cure, typically with a strength when bound to its intended substrates, measured as stress at break (peak stress) using the overlap shear test described in the Examples herein, of at least 4.14 MPa (600 psi), more typically at least 5.52 MPa (800 psi), in some embodiments at least 6.89 MPa (1000 psi), and in some embodiments at least 8.27 MPa (1200 psi);

"substituted" means, for a chemical species, group or moiety, substituted by conventional substituents which do not interfere with the desired product or process, e.g., substituents can be alkyl, alkoxy, aryl, phenyl, halo (F, Cl, Br, I), cyano, nitro, etc.;

"unitary" or "unitary article" refer to an article that is a single piece, though it may comprise elements that can be separately named, that is formed from a single piece or aliquot of material without division of that piece or aliquot (such as by extruding, casting, stamping, molding, forging, machining, sculpting, or the like), and that lacks seams or joints between elements.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides adhesives comprising: a) 35-85 weight percent of a pressure sensitive adhesive comprising: i) a polymer selected from rubbers and polyacrylate polymers and ii) optionally one or more tackifiers; and dispersed therein b) 15-50 weight percent fire retardant (FR) particles comprising one or more phosphorus-containing compounds selected from organophosphine oxides and organophosphinates. In some embodiments, the fire retardant (FR) particles comprise both an organophosphine oxide and an organophosphinate. The adhesive may be water-based. The adhesive may achieve good adhesion and fire retardancy while comprising essentially no heavy metals, essentially no halogen-containing compounds, and essentially no common solvents.

In various embodiments the adhesive may comprise 15-50 weight percent, 18-50 weight percent, 20-50 weight percent, 21-50 weight percent, 22-50 weight percent, 23-50 weight percent, 24-50 weight percent, or 25-50 weight percent of the fire retardant (FR) particles.

Any suitable polymer which forms a pressure sensitive adhesive may be used. Suitable polymers may include polyacrylate polymers. Typical PSA (meth)acrylate polymers include as monomers (meth)acrylate esters of linear, branched, or cyclic alcohols having between 4 and 20 carbons, including, as representative examples, methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl (meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof. Other monomer units of the polymer may be derived from polar (meth)acrylates such as (meth)acrylic acid. Other monomer units of the polymer may be derived from suitable radically polymerizable unsaturated monomers, including, as representative examples, vinyl acetate and styrene. In some embodiments, the PSA (meth)acrylate polymers may additionally comprise crosslinking monomers, such as polyfunctional monomers, such as polyvinyls or poly(meth)acrylates such as 1,6-hexanediol diacrylate.

Suitable polymers may include rubbers, which may include natural or synthetic rubbers. Suitable rubbers may include polymers or copolymers of substituted or unsubstituted isoprene, butadiene, or chloroprene, and may include copolymers with styrene, alkenes, or other radically polymerizable unsaturated monomers. Suitable rubbers may additionally include elastomeric silicones. Suitable rubbers may include combinations of any of the above.

The pressure sensitive adhesive may also comprise one or more tackifiers, particularly when the polymer is a rubber. When tackifiers are used, they may comprise 0.1-60 weight percent of the pressure sensitive adhesive. In other embodiments, tackifiers may comprise 1-60 weight percent, 5-60 weight percent, 8-60 weight percent, 0.1-45 weight percent, 1-45 weight percent, 5-45 weight percent, 8-45 weight percent, 0.1-30 weight percent, 1-30 weight percent, 5-30 weight percent, 8-30 weight percent, 0.1-20 weight percent, 1-20 weight percent, 5-20 weight percent, 8-20 weight percent, 0.1-15 weight percent, 1-15 weight percent, 5-15 weight percent, or 8-15 weight percent of the pressure sensitive adhesive.

Any suitable tackifiers may be used. Suitable tackifiers may include terpene phenolics, rosins, rosin esters, esters of hydrogenated rosins, synthetic hydrocarbon resins and combinations thereof. Commercially available tackifying resins may be used, such as: FORAL 85E (a glycerol ester of highly hydrogenated refined gum rosin) commercially available from Eastman, Middelburg, NL), FORAL 3085 (a glycerol ester of highly hydrogenated refined wood rosin) commercially available from Hercules Inc., Wilmington, DE; ESCOREZ 2520 and ESCOREZ 5615 (aliphatic/aromatic hydrocarbon resins) commercially available from ExxonMobil Corp., Houston, TX; and Regalite 7100 (a partially hydrogenated hydrocarbon resin) commercially available from Eastman, Kingsport, Tennessee; Super Ester E-730-55 (available from Arakawa), Pinecrystal KE-100 (available from Arakawa), Aquatac 2685 (available from Kraton).

Any suitable organophosphine oxides or organophosphinates FR particles may be used. Organic substituents of the organophosphine oxides or organophosphinates may be alkyl or aryl, and may include substituted or unsubstituted C1-C12 linear, branched, or cyclic alkyl groups, such as ethyl, n-propyl, isopropyl, n-butyl, isobutyl, and the like, or C1-C12 aryl groups, such as substituted or unsubstituted benzyl. The FR particles may have an average particle size (D50) of 1-200 micrometers, 40-200 micrometers, 70-200 micrometers, 90-200 micrometers, 1-120 micrometers, 40-120 micrometers, 70-120 micrometers, or 90-120 micrometers.

The present adhesives may be particularly useful as thin adhesive films. In some embodiments, the present adhesives may form free-standing films. Alternately the present adhesives may form an adhesive layer in a tape, in which case the adhesive layer may be borne on a backing. In some embodiments, the backing is metalized, for example, the backing may include a layer of aluminum foil. The tape may be an adhesive tape, bearing one or more external adhesive layers, or a non-adhesive tape containing the present adhesive as an internal layer. The present thin adhesive films, whether free-standing or as layers of a tape, may have a thickness of 5-1000 micrometers, 5-500 micrometers, 5-300 micrometers, 5-200 micrometers, 5-100 micrometers, 10-1000 micrometers, 10-500 micrometers, 10-300 micrometers, 10-200 micrometers, or 10-100 micrometers.

Additional embodiments are recited in the Selected Embodiments and Examples below.

SELECTED EMBODIMENTS

The following embodiments, designated by letter and number, are intended to further illustrate the present disclosure but should not be construed to unduly limit this disclosure.

A1. An adhesive comprising:
  a) 35-85 weight percent of a pressure sensitive adhesive comprising
    i) a polymer selected from rubbers and polyacrylate polymers; and
    ii) optionally one or more tackifiers;
  and dispersed therein
  b) 15-50 weight percent FR particles comprising one or more phosphorus-containing compounds selected from organophosphine oxides and organophosphinates.

A2. The adhesive according to embodiment A1 comprising essentially no heavy metals.

A3. The adhesive according to any of embodiments A1-A2 comprising essentially no halogen.

A4. The adhesive according to any of embodiments A1-A3 comprising essentially no common solvents.

A5. The adhesive according to any of embodiments A1-A4 wherein the FR particles have an average particle size of 1-120 micrometers.

A6. The adhesive according to any of embodiments A1-A4 wherein the FR particles have an average particle size of 40-120 micrometers.

A7. The adhesive according to any of embodiments A1-A4 wherein the FR particles have an average particle size of 70-120 micrometers.

A8. The adhesive according to any of embodiments A1-A7 wherein the phosphorus-containing compounds are selected from organophosphine oxides.

A9. The adhesive according to any of embodiments A1-A7 wherein the phosphorus-containing compounds comprise triphenyl phosphine oxide (TPPO).

A10. The adhesive according to any of embodiments A1-A7 wherein the phosphorus-containing compounds are selected from organophosphinates.

A11. The adhesive according to any of embodiments A1-A7 wherein the phosphorus-containing compounds comprise at least one organophosphine oxide and at least one organophosphinate.

A12. The adhesive according to any of embodiments A1-A7 wherein the phosphorus-containing compounds comprise 35-65 weight percent of an organophosphine oxide and 65-35 weight percent of an organophosphinate.

A13. The adhesive according to any of embodiments A1-A7 wherein the phosphorus-containing compounds comprise 40-60 weight percent of an organophosphine oxide and 60-40 weight percent of an organophosphinate.

A14. The adhesive according to any of embodiments A1-A7 wherein the phosphorus-containing compounds comprise 45-55 weight percent of an organophosphine oxide and 55-45 weight percent of an organophosphinate.

A15. The adhesive according to any of embodiments A1-A14 wherein the polymer is selected from polyacrylate polymers.

A16. The adhesive according to any of embodiments A1-A14 wherein the polymer is selected from rubbers.

A17. The adhesive according to any of embodiments A1-A16 wherein the pressure sensitive adhesive comprises one or more tackifiers in an amount of 0.1-60 weight percent of the pressure sensitive adhesive.

F1. An adhesive film comprising the adhesive according to any of embodiments A1-A17.

F2. The adhesive film according to embodiment F1 which is a free-standing film.

F3 The adhesive film according to any of embodiments F1-F2 having a thickness of between 5-1000 micrometers.

T1. A tape comprising the adhesive film according to any of embodiments F1-F3 borne on a backing.

T2. The tape according to embodiment T1 wherein the backing comprises an aluminum foil.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, WI, or may be synthesized by known methods.

All parts, percentages, ratios, etc. in the examples and the rest of the specification are by weight, unless noted otherwise. The following abbreviations may be used: m=meters; cm=centimeters; mm=millimeters; um=micrometers; ft=feet; in=inch; RPM=revolutions per minute; kg=kilograms; oz=ounces; lb=pounds; Pa=Pascals; sec=seconds; min=minutes; hr=hours; and RH=relative humidity. The terms "weight %", "% by weight", and "wt %" are used interchangeably.

| Materials | |
|---|---|
| ACRONAL 3630 | Acrylate adhesive available as ACRONAL 3630 from BASF SE, Ludwigshafen, Germany |
| AQUATAC 2685 | Tackifier available as AQUATAC 2685 from Kraton |
| BA | Butyl acrylate |
| BUTOFAN NS 222 | Styrene butadiene dispersion for use in flooring adhesives and waterproofing available as BUTOFAN NS 222 from BASF SE, Ludwigshafen, Germany |
| CatPoly 1 | Acrylate based polymer made as described below, including cationic and anionic monomers |
| CatPoly2 | Acrylate based polymer made as described below, including cationic and anionic monomers |
| DA | Diacetone acrylamide |
| DMAEA-MCL | N,N-dimethylaminoethyl acrylate methyl chloride quaternary, 80% in water, obtained under the trade designation "AGEFLEX FA1Q80MC" from BASF SE, Ludwigshafen, Germany. |
| EC-25 | Cocoalkylmethyl[polyoxyethylene (15)] ammonium chloride, 95% minimum active surfactant solution, obtained under the trade designation "ETHOQUAD C/25", from Akzo Nobel N.V., Amsterdam, Netherlands. |
| ENCOR 9466 | Acrylate polymer available as ENCOR 9466 from Arkema |
| GM | Glycidyl methacrylate |
| MAA | Methacrylic acid, obtained from Alfa Aesar, Ward Hill, MA. |
| OP 935 | Aluminum diethyl phosphinate available as EXOLIT ® OP 935 from Clariant, having a D95 of less than 10 μm |
| OP 945 | Aluminum diethyl phosphinate available as EXOLIT ® OP 945 from Clariant, having a D95 of less than 5 μm |
| PINECRYSTAL KE-100 | Rosin ester tackifier available from Arakawa Chemical Industries, LTD, Japan |
| PROCETYL (AWS-LQ-(AP)) | Surfactant from Europa |
| ROBOND 8915 | Acrylate adhesive available as ROBOND 8915 from Dow Chemical Company |
| Scrim | Fiberglass mesh |
| SUPER ESTER E-730-55 | Rosin ester tackifier available from Arakawa Chemical Industries, LTD, Japan |
| TPPO | Triphenylphosphine oxide available from TCI |
| TRILENE 65D | TRILENE 65D is a Ethylene-Propylene-Dicyclopentadiene elastomer available from Lion Copolymer, Geismar, Louisiana |
| V-50 | 2,2'-Azobis (2-amidinopropane) dihydrochloride, obtained from Wako Chemicals USA, Richmond, VA |
| VA | Vinyl acetate, obtained from Alfa Aesar, Ward Hill, MA |
| 0.5 mil clear PET | PET film |
| 0.5 mil metallized PET | PET film metallized with a layer of aluminum |

Synthesis of Cationic Water-Based Emulsion Polymer 1 (CatPoly1)

Cationic water-based emulsion polymer 1 (CatPoly1) was made according to patent application WO 2014/093375 A1. A 0.95 liter (32 ounce) glass bottle was charged with 89 g BA followed by addition of 4 g DMAEA-MCL, 2 g MAA, 5 g VA, 1 g GM, 100 g water, 1 g EC-25, and 0.375 g V-50. The reaction mixture was purged with nitrogen for two minutes, after which the bottle was sealed tight with a plastic cap. Next, the bottle was rotated in a water bath set at 50° C. for 24 hours. The pH of the resulting solution was adjusted to between 5 and 5.5 by adding aqueous sodium hydroxide solution, followed by filtering through a PET-50GG-355 mesh having an opening of 355 micrometers (available from Sefar Incorporated, Buffalo, NY). The amount of filtered coagulum was typically less than 1% by weight of the total amount of monomer, unless otherwise noted. The resulting emulsion was found to contain less than 0.5% wt. percent unreacted monomer by gravimetric analysis.

Synthesis of Cationic Water-Based Emulsion Polymer 2 (CatPoly2)

Cationic water-based emulsion polymer 2 (CatPoly2) was made according to patent application WO 2014/093375 A1. A 0.95 liter (32 ounce) glass bottle was charged with 89 g BA followed by addition of 4 g DMAEA-MCL, 2 g MAA, 5 g VA, 1 g DA, 100 g water, 1 g EC-25, and 0.375 g V-50. The reaction mixture was purged with nitrogen for two minutes, after which the bottle was sealed tight with a plastic cap. Next, the bottle was rotated in a water bath set at 50° C. for 24 hours. The pH of the resulting solution was adjusted to between 5 and 5.5 by adding aqueous sodium hydroxide solution, followed by filtering through a PET-50GG-355 mesh having an opening of 355 micrometers (available from Sefar Incorporated, Buffalo, NY). The amount of filtered coagulum was typically less than 1% by weight of the total amount of monomer, unless otherwise noted. The resulting emulsion was found to contain less than 0.5% wt. percent unreacted monomer by gravimetric analysis.

Burn Testing Procedure

Burn testing samples were constructed as follows. Adhesive was coated onto 0.5 mil clear and 0.5 mil metallized PET using Mayer Rod 14 on glass. The substrates were then dried in a 140° F. oven for 3 minutes. A layer of scrim was then placed onto one side and the two adhesive layers bound together to form a construction comprising in order: clear PET, adhesive, scrim, adhesive, metalized PET.

A modified UL 181 burn test was then conducted on the PET construction. The sample was bonded to fiberglass, metal side out, and attached to a rod at a 45° angle. A Bunsen burner flame was preset with a 2" to 2.5" soft yellow flame and placed just below the metallized PET. A construction passed the burn test where the flame self-extinguished before reaching an edge of the construction. A construction failed the burn test where the burned to its edges.

A good pass is defined as burning less than 25% of a 6" by 21" construction and not burning to the edges of a sheet.

A pass burn in define as burning less than 50% of a 6" by 21" construction and not burning to the edges of a sheet.

A slight pass burn in define as burning less than 75% of a 6" by 21" construction and not burning to the edge of a sheet.

A slight fail is defined as burning greater than 50% of the 6" by 21" construction and hitting the edge of the sheet.

A fail is defined as burning greater than 75% of the 6" by 21" construction and burning to the edge of the sheet.

Example 1: Fire Retardant Premix Preparation

Fire retardant Premix 1: Exolit OP 935 (99 parts, 247.5 g), deionized water (99 parts, 247.5 g) and PROCETYL (AWS-LQ-(AP)) (2 parts, 5.0 g) was added to an industrial blender. The mixture was then blended on high speed until a smooth, consistent mixture was achieved.

Fire retardant Premix 2: Exolit OP 945 (99 parts, 247.5 g), deionized water (99 parts, 247.5 g) and PROCETYL (AWS-LQ-(AP)) (2 parts, 5.0 g) was added to an industrial blender. The mixture was then blended on high speed until a smooth, consistent mixture was achieved.

Fire retardant Premix 3: TPPO (250 g) was placed into a 250 mL jar with ¼" steel ball bearings, placed on a roller for 48 hours' and milled to a size of about D50=100 micron. The resulting powder of TPPO (99 parts, 99.0 g) was placed together with water (99 parts, 99.0 g) and PROCETYL (AWS-LQ-(AP)) (2 parts, 2.0 g) into an industrial blender. The mixture was the blended on high speed until a smooth, consistent mixture was achieved. This resulted in D50≈100 micron.

Fire retardant Premix 4: TPPO (250 g) was placed into a 250 mL jar with ¼"-½" steel ball bearings, placed on a pant shaker for 40 min, and milled to a size of about D50=34 micron. The resulting powder of TPPO (99 parts, 99.0 g) was placed with water (99 parts, 99.0 g) and PROCETYL (AWS-LQ-(AP)) (2 parts, 2.0 g) into an industrial blender. The mixture was the blended on high speed until a smooth, consistent mixture was achieved.

Fire retardant Premix 5: TPPO (500 g) was wet milled to a size of about D50=5 micron in water, which resulted in a final mixture of 25% solids.

Example 2

BUTOFAN NS 222 (100 parts, 14.2 g), fire retardant premix 1 (50 parts, 7.1 g), fire retardant premix 3 (50 parts, 7.1 g) and Super Ester E-730-55 (10 parts, 1.4 g) were added to a 125 mL plastic bottle. The mixture was then shaken by hand and a VWR analog vortex mixer to form a coatable adhesive.

Example 3

BUTOFAN NS 222 (100 parts, 18.5 g), fire retardant premix 1 (25 parts, 4.6 g), fire retardant premix 3 (25 parts, 4.6 g) and Super Ester E-730-55 (10 parts, 1.9 g) were added to a 125 mL plastic bottle. The mixture was then shaken by hand and a VWR analog vortex mixer to form a coatable adhesive.

Example 4

ACRONAL 3630 (100 parts, 18.5 g), fire retardant premix 1 (25 parts, 4.6 g), fire retardant premix 3 (25 parts, 4.6 g) and Super Ester E-730-55 (10 parts, 1.9 g) were added to a 125 mL plastic bottle. The mixture was then shaken by hand and a VWR analog vortex mixer to form a coatable adhesive.

Example 5

CATPOLY1 (100 parts, 14.9 g), fire retardant premix 2 (50 parts, 7.4 g), and fire retardant premix 3 (50 parts, 7.4 g) were added to a 125 mL plastic bottle. The mixture was then shaken by hand and a VWR analog vortex mixer to form a coatable adhesive.

Example 6

CATPOLY2 (100 parts, 14.9 g), fire retardant premix 2 (50 parts, 7.4 g), and fire retardant premix 3 (50 parts, 7.4 g) were added to a 125 mL plastic bottle. The mixture was then shaken by hand and a VWR analog vortex mixer to form a coatable adhesive.

Example 7

ROBOND 8915 (100 parts, 14.2 g), fire retardant premix 2 (50 parts, 7.1 g), fire retardant premix 3 (50 parts, 7.1 g) and Super Ester E-730-55 (10 parts, 1.4 g) were added to a 125 mL plastic bottle. The mixture was then shaken by hand and a VWR analog vortex mixer to form a coatable adhesive.

Example 8

ROBOND 8915 (100 parts, 17.6 g), fire retardant premix 2 (26 parts, 4.6 g), fire retardant premix 3 (27.5 parts, 4.8 g) and Tacolyn (15 parts, 2.6 g) were added to a 125 mL plastic bottle. The mixture was then shaken by hand and a VWR analog vortex mixer to form a coatable adhesive.

Example 9

ROBOND 8915 (100 parts, 14.2 g), fire retardant premix 2 (25 parts, 3.6 g), fire retardant premix 3 (75 parts, 10.6 g) and Super Ester E-730-55 (10 parts, 1.4 g) were added to a 125 mL plastic bottle. The mixture was then shaken by hand and a VWR analog vortex mixer to form a coatable adhesive.

Example 10

ROBOND 8915 (100 parts, 14.2 g), fire retardant premix 2 (75 parts, 10.6 g), fire retardant premix 3 (25 parts, 3.6 g) and Super Ester E-730-55 (10 parts, 1.4 g) were added to a 125 mL plastic bottle. The mixture was then shaken by hand and a VWR analog vortex mixer to form a coatable adhesive.

Example 11

ROBOND 8915 (100 parts, 14.2 g), fire retardant premix 3 (100 parts, 14.2 g) and Super Ester E-730-55 (10 parts, 1.4 g) were added to a 125 mL plastic bottle. The mixture was then shaken by hand and a VWR analog vortex mixer to form a coatable adhesive.

Example 12

ENCOR 9466 (100 parts, 15.8 g), fire retardant premix 2 (44 parts, 6.9 g), and fire retardant premix 3 (44 parts, 6.9 g) were added to a 125 mL plastic bottle. The mixture was then shaken by hand and a VWR analog vortex mixer to form a coatable adhesive.

Example 13

BUTOFAN NS 222 (100 parts, 15.2 g), OP 945 (21 parts, 3.2 g), fire retardant premix 4 (21 parts, 3.2 g), Super Ester E-730-55 (11 parts, 1.7 g), Water (42 parts, 6.4 g) and PROCETYL AWS-LQ-(AP) (2 parts, 0.3 g) were added to a 125 mL plastic bottle. The mixture was stirred using a dispersion blade to form a coatable adhesive.

Example 14

BUTOFAN NS 222 (100 parts, 14.2 g), fire retardant premix 2 (40 parts, 5.2 g), fire retardant premix 5 (80 parts, 10.3 g), Super Ester E-730-55 (11 parts, 1.4 g) and PROCETYL AWS-LQ-(AP) (2 parts, 0.3 g) were added to a 125 mL plastic bottle. The mixture was then shaken by hand and a VWR analog vortex mixer to form a coatable adhesive.

Example 15

BUTOFAN NS 222 (100 parts, 16.0 g), fire retardant premix 2 (50 parts, 6.0 g), fire retardant premix 3 (50 parts, 6.0 g) and PINECRYSTAL KE-100 (11 parts, 1.6 g) were added to a 125 mL plastic bottle. The mixture was then shaken by hand and a VWR analog vortex mixer to form a coatable adhesive.

Example 16

ROBOND 8915 (100 parts, 14.2 g), fire retardant premix 3 (100 parts, 14.2 g) and Super Ester E-730-55 (10 parts, 1.4 g) were added to a 125 mL plastic bottle. The mixture was then shaken by hand and a VWR analog vortex mixer to form a coatable adhesive.

Example 17

ROBOND 8915 (100 parts, 14.2 g), fire retardant premix 1 (100 parts, 14.2 g) and Super Ester E-730-55 (10 parts, 1.4 g) were added to a 125 mL plastic bottle. The mixture was then shaken by hand and a VWR analog vortex mixer.

Example 18

TRILENE 65D (19.0 g), OP 945 (2.5 g), 100 μm TPPO (2.5 g), deionized water (4.9 g), AQUATAC 2685 (0.8 g) and PROCETYL AWS-LQ-(AP) (0.4 g) were added to a 125 mL plastic bottle. The mixture was stirred using a dispersion blade to form a coatable adhesive.

The Burn Testing Procedure was performed on samples of each of Examples 2-18 and the results are reported in Table 1.

TABLE 1

| Ex | Organophosphinate FR Particles | Organophosphine oxide FR Particles | Burn Performance 45° |
|----|-------------------------------|-------------------------------------|----------------------|
| 2  | OP 935 | TPPO D50 = 100 um | Good Pass |
| 3  | OP 935 | TPPO D50 = 100 um | Fail |
| 4  | OP 935 | TPPO D50 = 100 um | Fail |
| 5  | OP 945 | TPPO D50 = 100 um | Pass |
| 6  | OP 945 | TPPO D50 = 100 um | Pass |
| 7  | OP 945 | TPPO D50 = 100 um | Good Pass |
| 8  | OP 945 | TPPO D50 = 100 um | Fail |
| 9  | OP 945 | TPPO D50 = 100 um | Pass |
| 10 | OP 945 | TPPO D50 = 100 um | Slight Pass |
| 11 | none   | TPPO D50 = 100 um | Slight Pass |
| 12 | OP 945 | TPPO D50 = 100 um | Slight Fail |
| 13 | OP 945 | TPPO D50 = 34 um  | Pass |
| 14 | OP 945 | TPPO D50 = 5 um   | Slight Pass |
| 15 | OP 945 | TPPO D50 = 100 um | Pass |
| 16 | none   | TPPO D50 = 100 um | Slight Pass |
| 17 | OP 935 | none              | Pass |
| 18 | OP 945 | TPPO D50 = 100 um | Good Pass |

It was discovered that an increase in particle size of TPPO resulted in an increase of fire retardancy.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. An adhesive comprising:
   a) 35 weight percent to 85 weight percent of a pressure sensitive adhesive comprising:
      i) a polymer selected from rubbers and polyacrylate polymers; and
      ii) optionally one or more tackifiers;
   and dispersed therein
   b) 15 weight percent to 50 weight percent fire retardant particles consisting of one or more phosphorus-containing compounds selected from the group consisting of organophosphine oxides represented by formula $R_3P(O)$ and organophosphinates represented by formula $R_2P(O)(OR)$, wherein each R is independently selected from organic groups.

2. The adhesive according to claim 1 comprising essentially no common solvents.

3. The adhesive according to claim 1, wherein the fire retardant particles have an average particle size of 1 micrometer to 120 micrometers.

4. The adhesive according to claim 1, wherein the fire retardant particles have an average particle size of 40 micrometers to 120 micrometers.

5. The adhesive according to claim 1, wherein the fire retardant particles have an average particle size of 70 micrometers to 120 micrometers.

6. The adhesive according to claim 1, wherein the phosphorus-containing compounds are selected from organophosphine oxides.

7. An adhesive film comprising the adhesive according to claim 6.

8. The adhesive film according to claim 7 which is a free-standing film.

9. The adhesive film according to claim 7 having a thickness of between 5 micrometers and 1000 micrometers.

10. A tape comprising the adhesive film according to claim 7 borne on a backing.

11. The tape according to claim 10 wherein the backing comprises an aluminum foil.

12. The adhesive according to claim 1, wherein the phosphorus-containing compounds comprise triphenyl phosphine oxide.

13. The adhesive according to claim 1, wherein the phosphorus-containing compounds are selected from organophosphinates.

14. The adhesive according to claim 1, wherein the phosphorus-containing compounds comprise at least one organophosphine oxide and at least one organophosphinate.

15. The adhesive according to claim 1, wherein the pressure sensitive adhesive comprises one or more tackifiers in an amount of 0.1 weight percent to 60 weight percent of the pressure sensitive adhesive.

16. An adhesive film comprising the adhesive according to claim 1.

17. The adhesive film according to claim 16 which is a free-standing film.

18. The adhesive film according to claim 16 having a thickness of between 5 micrometers and 1000 micrometers.

19. A tape comprising the adhesive film according to claim 16 borne on a backing.

20. The tape according to claim 19 wherein the backing comprises an aluminum foil.

* * * * *